United States Patent
Kofinas et al.

(10) Patent No.: US 7,063,918 B2
(45) Date of Patent: Jun. 20, 2006

(54) NANOSCALE SOLID-STATE POLYMERIC BATTERY SYSTEM

(75) Inventors: Peter Kofinas, North Bethesda, MD (US); Steven Bullock, Silver Spring, MD (US)

(73) Assignee: The University of Maryland, College Park, College Park, MD (US)

( * ) Notice: Subject to any disclaimer, the term of this patent is extended or adjusted under 35 U.S.C. 154(b) by 469 days.

(21) Appl. No.: 10/380,697

(22) PCT Filed: Oct. 22, 2001

(86) PCT No.: PCT/US01/32558

§ 371 (c)(1),
(2), (4) Date: Mar. 17, 2003

(87) PCT Pub. No.: WO02/35619

PCT Pub. Date: May 2, 2002

(65) Prior Publication Data

US 2004/0062988 A1    Apr. 1, 2004

Related U.S. Application Data

(60) Provisional application No. 60/304,054, filed on Jul. 10, 2001, provisional application No. 60/242,463, filed on Oct. 23, 2000.

(51) Int. Cl.
*H01M 4/60*    (2006.01)
*H01M 10/40*    (2006.01)

(52) U.S. Cl. .................. 429/317; 429/213; 429/303
(58) Field of Classification Search .............. 429/303, 429/317, 213, 231.3
See application file for complete search history.

(56) References Cited

U.S. PATENT DOCUMENTS

| | | | |
|---|---|---|---|
| 4,640,006 A | 2/1987 | Elsenbaumer et al. | ..... 29/623.1 |
| 4,981,561 A | 1/1991 | Babinec et al. | ............... 204/81 |
| 5,314,760 A | 5/1994 | Tsou et al. | ..................... 429/12 |
| 5,491,039 A | 2/1996 | Shackle | ...................... 429/192 |
| 5,491,041 A | 2/1996 | Abraham et al. | ........... 429/212 |
| 5,510,209 A | 4/1996 | Abraham et al. | ........... 429/192 |
| 5,548,055 A | 8/1996 | Narang et al. | ................. 528/25 |
| 5,597,661 A | 1/1997 | Takeuchi et al. | .............. 429/42 |
| 5,633,098 A | 5/1997 | Narang et al. | .............. 429/104 |
| 5,665,490 A | 9/1997 | Takeuchi et al. | ............ 429/192 |

(Continued)

FOREIGN PATENT DOCUMENTS

WO    WO 91/20105    12/1991

(Continued)

OTHER PUBLICATIONS

Cheong Chan, Y.N. et al. (1992) "Synthesis of Palladium and Platinum Nanoclusters Within Microphase-Separated Diblock Polymers," Chem. Mater. 4:885-894.

(Continued)

*Primary Examiner*—Tracy Dove
(74) *Attorney, Agent, or Firm*—Jeffrey I. Auerbach

(57) ABSTRACT

The present invention relates to a unique polymeric battery system of electrochemical cells that are connected in series, and can be of nanometer size. The polymers possess conjugated bonds along their backbones and high levels of metals. The invention also concerns methods for the fabrication of the polymers and battery system as well as methods for the use of the polymers as a nanoscale solid-state battery.

12 Claims, 10 Drawing Sheets

ABC Triblock Polymer (Organometallic Li)

U.S. PATENT DOCUMENTS

| | | | |
|---|---|---|---|
| 5,677,081 A | 10/1997 | Iwamoto et al. | 429/191 |
| 5,731,104 A | 3/1998 | Ventura et al. | 429/188 |
| 5,874,184 A | 2/1999 | Takeuchi et al. | 429/192 |
| 5,998,559 A | 12/1999 | Narang et al. | 528/14 |
| 6,015,638 A | 1/2000 | Ventura et al. | 429/307 |
| 6,165,646 A | 12/2000 | Takada et al. | 429/322 |

FOREIGN PATENT DOCUMENTS

| | | |
|---|---|---|
| WO | WO 94/13024 | 6/1994 |
| WO | WO 95/07555 | 3/1995 |
| WO | WO 95/14311 | 5/1995 |
| WO | WO 95/33863 | 12/1995 |
| WO | WO 97/19481 | 5/1997 |
| WO | WO 02/35619 | 5/2002 |

OTHER PUBLICATIONS

Chu P.P., et al. (1998) "Exceedingly High Lithium Conductivity In Novolac Type Phenolic Resin/PEO Blends," Macromolecules 32:4738-4740.

Clay R.T. et al. (1997) "Synthesis Of Metal Nanoclusters Within Microphase-Separated Diblock Polymers: ICP-AES Analysis Of Metal Ion Uptake," Supramolec. Science 4:113-119.

Cummins, C.C. et al. (1991) "Synthesis of Norborenes Containing Tin(II), Tin(IV), Lead(II), And Zinc(II) And Their Polymerization To Give Microphase-Separated Block Polymers," Chem. Mater. 3:1153-1163.

Llompart, S. et al. (1991) "Oxygen regeneration of discharged manganese dioxide electrode," J. Electrochem. Soc. 138(3):665-669.

Macglashan, Y. G. et al. (1999) "Structure Of The Polymer Electrolyte Poly(ethylene oxide)$_6$ LiAsF$_6$" Nature 398:792-794 (1999).

Maynard H.D. et al. (1999) "Structure Of Functionalized Polyethers By Ring-Opening Metathesis Polymerization Of Unsaturated Crown Ethers," Macromolecules 32:6917-6924.

10-50 nM

ABC Triblock Polymer (Organometallic Co)

AB BC Diblock Polymer (Organometallic Co)

NANOSCALE SOLID-STATE POLYMERIC BATTERY SYSTEM

CROSS-REFERENCE TO RELATED APPLICATIONS

This application claims priority to U.S. patent applications Ser. Nos. 60/304,054 (filed Jul. 10, 2001) and 60/242,463 (filed Oct. 23, 2000), both of which applications are herein incorporated by reference in their entirety.

USE OF GOVERNMENTAL FUNDS

The present invention was funded in part through funds of the U.S. Government (ONR Contract No N00140010039). The U.S. Government may have certain rights in this invention.

FIELD OF THE INVENTION

The present invention relates to a unique polymeric battery system of electrochemical cells that are connected in series, and can be of nanometer size. The polymers possess conjugated bonds along their backbones and high levels of metals. The invention also concerns methods for fabrication of the polymers and battery system as well as methods for the use of the polymers as a nonscale solid-state battery.

BACKGROUND OF THE INVENTION

Batteries are devices that covert chemical energy within its material constituents into electrical energy. Three structural components are required for such transfer: the anode, or negative electrode material, which is oxidized, the electrolyte, which serves as a conductor of charged ions or electrons, and the cathode, or positive electrode, which is reduced. Chemical reactions at the electrodes produce an electronic current that can be made to flow through an appliance connected to the battery. In a rechargeable (or "secondary") battery, once the reactions have run their course, they can be reversed by the action of a power supply or charger. Desirable characteristics of secondary batteries include high power density, high discharge rates, flat discharge curves, and a good low-temperature performance.

The process of transferring electrons from one material to another involves a redox reaction in which one material is reduced (thereby acquiring electrons) and another oxidized (thereby releasing electrons). The choice of materials used to form a battery is complicated, and is affected by the chemistry of the redox reaction, as well as by concerns relating to battery size, weight and cost, by polarization, and by complications caused by reactivity with other components (www.hrst.mit.edu/hrs/materials/public/Tutorial_solid_state_batteries.htm). The anode should be a good reducing agent, exhibit good conductivity and stability, and be easy and cheap to produce. Metals are most commonly used as anodes. The lightest metal, lithium, has most often been chosen. Lithium is also very electropositive (so that combined with an electronegative cathode, a large electromotive force will result). The electrolyte must be an insulator of electrons to prevent the battery cell from self-discharging. It also serves as a charge separator of the two electrodes. At the same time it must be an ionic conductor. In typical batteries, the electrolyte is composed of a liquid such as water having dissolved salts, acids or alkalis. Cathode materials are especially important for the quality of the battery: the available energy of the battery is proportional to the cathode size and directly related to many other characteristics.

The classical secondary battery contains two reversible solid-reactant electrodes and a liquid electrolyte: $S^-/L/S^+$. The Plante lead-acid cell commonly employed in car batteries is a typical example: $Pb/H_2SO_4/PbO_2$. During discharge, the so-called double sulphate reaction occurs: $Pb+PbO_2+2H_2SO_4 \rightarrow 2PbSO_4+2H_2O$ (both electrodes are converted into lead sulphate) (see Visco et al., U.S. Pat. No. 5,516,598. The processes at the two electrodes involve dissolution and precipitation, as opposed to solid-state ion transport or film formation. The cadmium-nickel battery used for heavy-duty tasks and emergency (standby) power is a second example of a classical secondary battery. Sealed cadmium-nickel batteries are widely used for smaller appliances, portable tools, electronic and photographic equipment, memory back-up etc. The basic electrochemistry of discharge is: $2NiOOH+2H_2O+Cd \rightarrow 2Ni(OH)_2+Cd(OH)_2$. In this discharge reaction, trivalent nickel hydroxide is reduced to divalent nickel hydroxide through the consumption of water, and metallic cadmium is oxidized into cadmium hydroxide. Liquid electrolyte batteries are disclosed by Ventura et al. U.S. Pat. No. 5,731,104; Ventura et al., U.S. Pat. No. 6,015,638.

In order to identify battery systems that might provide couple electrochemical properties with smaller size or weight, researchers have long sought to define suitable solid-state battery systems. Solid electrolytes are of particular interest for secondary batteries and for fuel cells (www.web.mit.edu/newsoffice/tt/1998/apr29/battery.html; Munshi M Z A (ed.), "Handbook Of Solid-state Batteries And Capacitors," Intermedics Inc., USA, (1995). The first such system (a sodium/sodium-β-alumina/sulfur battery) was developed in 1967, and used a polycrystalline ceramic (b-alumina) to conduct sodium ions at temperatures above 350° C. Unresolved problems, including high failure rates, the short lifetime of the ceramic electrolyte and lack of reproducibility have limited the utility of such batteries.

Reversible lithium solid-state batteries have been developed in which an anode of metallic lithium is separated from the cathode (an intercalation compound such as titanium disulfide or lithium cobalt oxide) by a glass electrolyte. One advantage of this type of battery is that the overall resistance does not increase with discharge. The electromotive force (emf) is approximately 2V (this emf can vary widely with cathode materials) with only a slight and continuous decrease with loss of capacity. This contrasts with conventional batteries, which experience an abrupt loss of voltage without warning upon depletion. For example, such batteries may contain an anode having lithium between graphitic coke layers, an amorphous polymer electrolyte (such as $LiCoO_2/$El/carbon; $LiNiO_2$/El/carbon; or $LiNi_{0.2}CoO_{0.8}$/El/carbon). Although lithium cobalt oxide ($CoO_2$) is similar to titanium sulfide ($TiS_2$) in structure and behaviour, it is much more oxidizing than $TiS_2$, and thus produces a cell having an emf of about 3.5V, almost three times as much as a nickel-cadmium or nickel-hydride battery. Secondary lithium batteries are discussed by Iwamoto et al. (U.S. Pat. No. 5,677,081) and Takada et al. (U.S. Pat. No. 6,165,646). Additional information relevant to efforts to define improved battery systems is disclosed in WO9719481, WO09514311; WO09533863; WO09507555; WO09413024; WO09120105, and in Abraham et al., U.S. Pat. Nos. 5,510,209 and 5,491,041.

Polymeric compounds have also been used in batteries (see, e.g., Narang et al., U.S. Pat. Nos. 5,998,559 and 5,633,098, which describe the formation of batteries having a single-ion electrolyte through the use of functionalized polysiloxanes, polymethacrylates and poly(alkylene oxides). Takeuchi et al. (U.S. Pat. Nos. 5,874,184 and 5,665,490) discloses a battery having a solid polymer electrolyte comprising a composite of a polymeric component (see also, Narang et al. U.S. Pat. No. 5,548,055. Polymeric compounds used in batteries are also discussed by Llompart, S. et al., "Oxygen-Regeneration of Discharged Manganese Dioxide Electrode II-General Phenomena Observed on Electro-Deposited Layer Electrodes and Membrane Electrodes," J. Electrochem. Soc., Vol. 138 (No. 3), page 665 (1991); see also Takeuchi, et al. (U.S. Pat. No. 5,597,661).

Despite such efforts, a need remained to find materials with high conductivity at ambient temperatures. High molecular weight polyethylene oxide hosts with lithium salts, polyvinyl ether hosts, and electrolytes formed by trapping a low molecular weight liquid solution of a lithium salt in an aprotic organic solvent, within the polymer matrix of a high molecular weight material have all been explored in a search for suitable materials.

In particular, conventional, liquid electrolyte batteries have significant drawbacks, particularly for electronics. These disadvantages include weight, large size, and the possibility that the electrolyte might leak. In addition, as computers and mobile phones have become smaller and faster, their demands for battery power have increased. Although solid-state batteries typically have a lower-power density than conventional batteries, they exhibit improved energy density, are re easily miniaturized (even as thin films), and cannot leak. In addition they are long-lived and their performance does not markedly change at high or low temperatures. For these reasons, solid-state batteries are well suited for electronic devices. The present configurations of solid-state battery have a liquid or gel electrolyte between the anode and cathode. Unfortunately, such battery configurations lead to problems involving electrolyte loss and decreased performance over time. A need therefore exists for improved solid-state battery systems. The present invention addresses this and other needs.

SUMMARY OF THE INVENTION

The present invention relates to a unique polymeric battery system of electrochemical cells that are connected in series, and can be of nanometer size. The polymers possess conjugated bonds along their backbones and high levels of metals. The invention also concerns methods for the fabrication of the polymers and battery system as well as methods for the use of the polymers as a nanoscale solid-state battery.

In detail, the invention comprises an anode of a solid-state battery comprising an organometallic polymer of the structure:

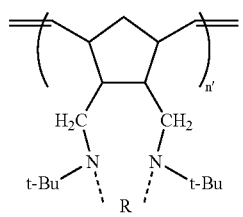

wherein n' is greater than 50 (and preferably greater than 100), and R is a divalent and/or transition metal (such as Co, Mn, Zn, etc.), or an alkali earth metal atom or is two monovalent metals or alkali earth metals.

The invention particularly concerns the embodiment of such anode, wherein the organometallic polymer has the structure:

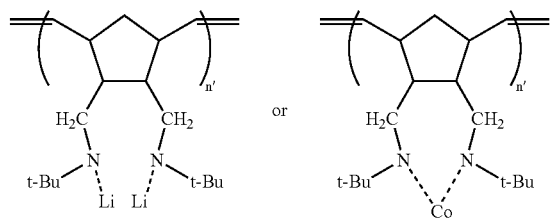

The invention further concerns the embodiment of such anode, wherein the polymer is produced through the polymerization of a monomer having the structure:

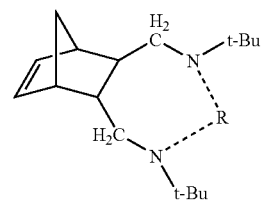

wherein R is a divalent and/or transition metal (such as Co, Mn, Zn, etc.), or an alkali earth metal atom or is two monovalent metals or alkali earth metals, such as, wherein the monomer has the structure:

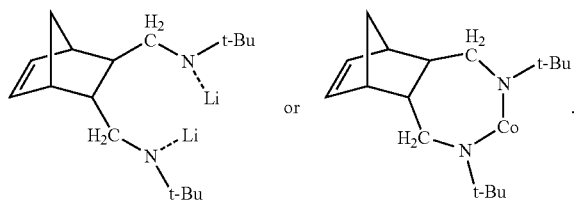

The invention further concerns a cathode of a solid-state battery comprising a polymer having the structure:

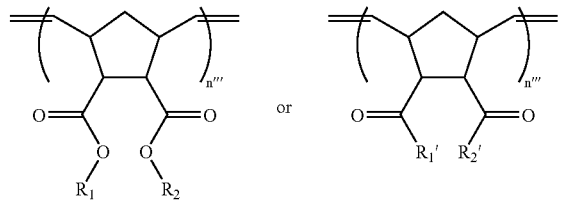

wherein n''' is greater than 50, and wherein R1, R2, R1' and R2' are polar substituent groups that may be used to coordinate and form either ionic or covalent bonds with metals or metal oxides, and may be the same or different R1 and R2 will preferably be selected from the group consisting of TMS, CH3, H, or Na; R1' and R2' will preferably be selected from the group consisting of or may be OTMS, OCH$_3$, OH, ONa, and NH$_3$. OCH$_3$ is a peroxide that is unstable in water, and will decompose to OH.

The invention further concerns the embodiment of such cathode, wherein the polymer is produced through the polymerization of a monomer having the structure:

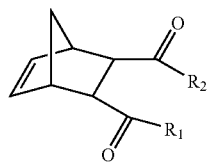

wherein R1 and R2 are polar substituent groups that may be used to coordinate and form either ionic or covalent bonds with metals or metal oxides, and may be the same or different. R1 and R2 will preferably be selected from the group consisting of TMS, OCH$_3$, OH, ONa, and CH$_3$.

The invention further provides a solid-state battery system comprising a battery comprising an anode polymer connected to an electrolyte polymer, wherein the anode polymer has the structure:

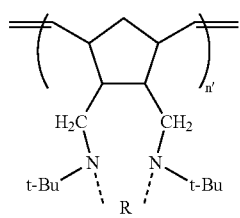

wherein n' is greater than 50, and R is a divalent metal or alkali earth metal atom or is two monovalent metals or alkali earth metals; and wherein the electrolyte polymer is a polyethylene oxide (PEO) polymer having the structure:

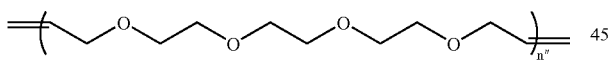

wherein n" is greater than 50.

The invention further concerns the embodiment of such battery system wherein the anode polymer has the structure:

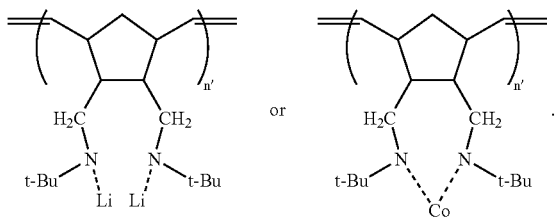

The invention further a solid-state battery system comprising a battery comprising a cathode polymer connected to an electrolyte polymer, wherein the cathode polymer has the structure:

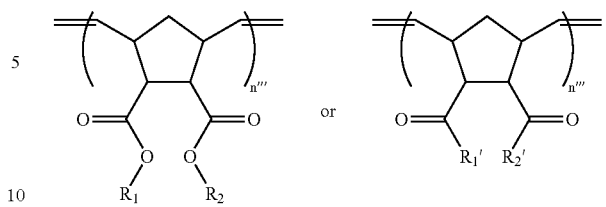

wherein n''' is greater than 50, and wherein R1 and R2 may be the same or different, and are selected from the group consisting of TMS, CH3, H, or Na;

wherein R1' and R2' may be the same or different, and are selected from the group consisting of or may be OTMS, OCH$_3$, OH, ONa, and NH$_3$ (the additional oxygen would make an unstable peroxy-type compound, and thus the non-peroxy variant is preferred); and wherein the electrolyte polymer is a polyethylene oxide (PEO) polymer having the structure:

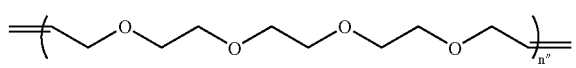

wherein n" is greater than 50. The PEO electrolyte can also optionally have a metal or metal oxide filler, which has been shown to enhance low temperature ionic conductivity. This metal or metal oxide filler can be blended in using standard polymer processing techniques.

The invention further concerns a solid-state battery system comprising a battery comprising an anode polymer connected to an electrolyte polymer, which is connected to a cathode polymer, wherein the anode polymer has the structure:

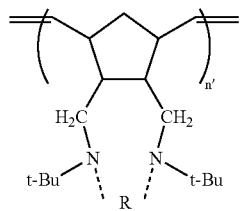

wherein n' is greater than 50, and R is a divalent and/or transition metal metal or an alkali earth metal atom or is two monovalent metals or alkali earth metals; wherein the electrolyte polymer is a polyethylene oxide (PEO) polymer having the structure:

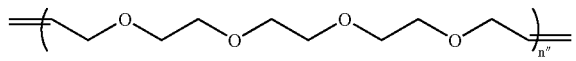

wherein n" is greater than 50; and wherein the cathode polymer has the structure:

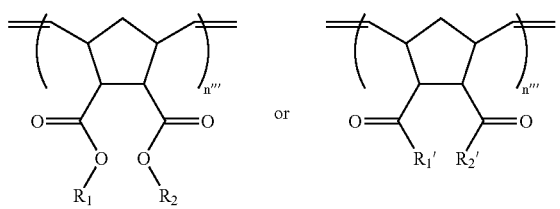

wherein n''' is greater than 50, and wherein R1 and R2 may be the same or different, and are selected from the group consisting of TMS, CH3, H, or Na;

wherein R1' and R2' may be the same or different, and are selected from the group consisting of or may be OTMS, OCH$_3$, OH, ONa, and NH$_3$.

The invention further concerns the embodiment of such battery system wherein the anode polymer has the structure:

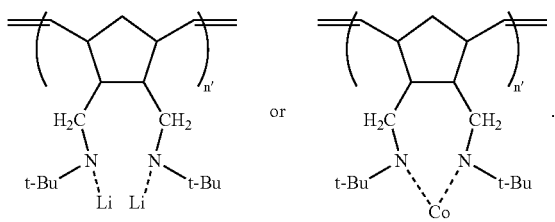

The invention further concerns the embodiment of all such battery systems wherein the battery is a film, coating or sheet.

The invention also concerns a computer powered by a battery system comprising a battery comprising an anode polymer connected to an electrolyte polymer, which is connected to a cathode polymer, wherein the anode polymer has the structure:

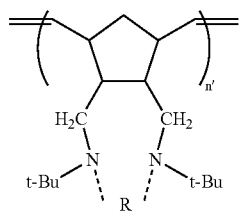

wherein n' is greater than 50, and R is a divalent metal or alkali earth metal atom or is two monovalent metals or alkali earth metals; wherein the electrolyte polymer is a polyethylene oxide (PEO) polymer having the structure:

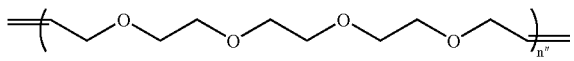

wherein n" is greater than 50; and wherein the cathode polymer has the structure:

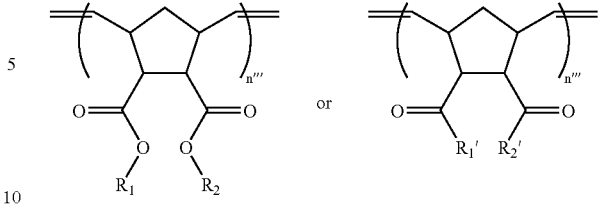

wherein n''' is greater than 50, and wherein R1 and R2 may be the same or different, and are selected from the group consisting of TMS, CH3, H, or Na;

wherein R1' and R2' may be the same or different, and are selected from the group consisting of or may be OTMS, OCH$_3$, OH, ONa, and NH$_3$.

The invention further concerns the embodiment of such computer wherein the anode polymer has the structure:

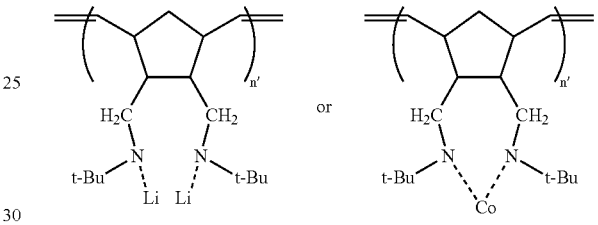

The invention further concerns the embodiment of all such computers wherein the computer is a cellular telephone, pager, or two-way radio, or is a personal computer, PDA, or laptop computer, or is a global positioning system or camera.

DESCRIPTION OF THE PREFERRED EMBODIMENTS

I. The Unique Polymeric Battery Systems of the Present Invention

The present invention relates to unique polymeric battery systems of electrochemical cells that are connected in series, and can be of nanometer size.

As used herein, the term "battery" refers to an electrochemical cell, capable of generating current, or storing chemical energy, composed of an anode in contact with an electrolyte, in contact with a cathode. As used herein, the term "battery system" refers to a battery or to a device, such as a capacitor, capable of generating current, which may additionally comprise leads or other connectors for charging or discharging the battery, or which may additionally comprise housings, cases, covers, etc.

The polymers of the battery systems of the present invention possess conjugated bonds along their backbones and high levels of metals. The invention also concerns methods for the fabrication of the polymers and battery system as well as methods for the use of the polymers as a nanoscale solid-state battery.

In particular, the present invention relates to an A/B/C "triblock" copolymer—metal nanocomposite, and to methods for its fabrication and use as a nanoscale solid-state battery. Preferably, the A/B/C triblock copolymer will exhibit a lamellar microphase separation, in which the A block polymer forms the anode, the B block polymer forms a polymeric electrolyte and the C block polymer forms the cathode. Casting of the synthesized polymer from a solvent can be conducted so as to result in a self-assembled lamellar A/B/C nanostructure, which is equivalent to many battery cells in series. The A, B, and C Blocks are chemically linked, but are exhibit a microphase separation due to block incompatibility, crystallization, etc. They can be used as templates for the synthesis of metal and metal oxide nanoclusters through various processes including, but not limited to, metal salt introduction and subsequent reduction and/or oxidation by chemical means.

Figure 1:
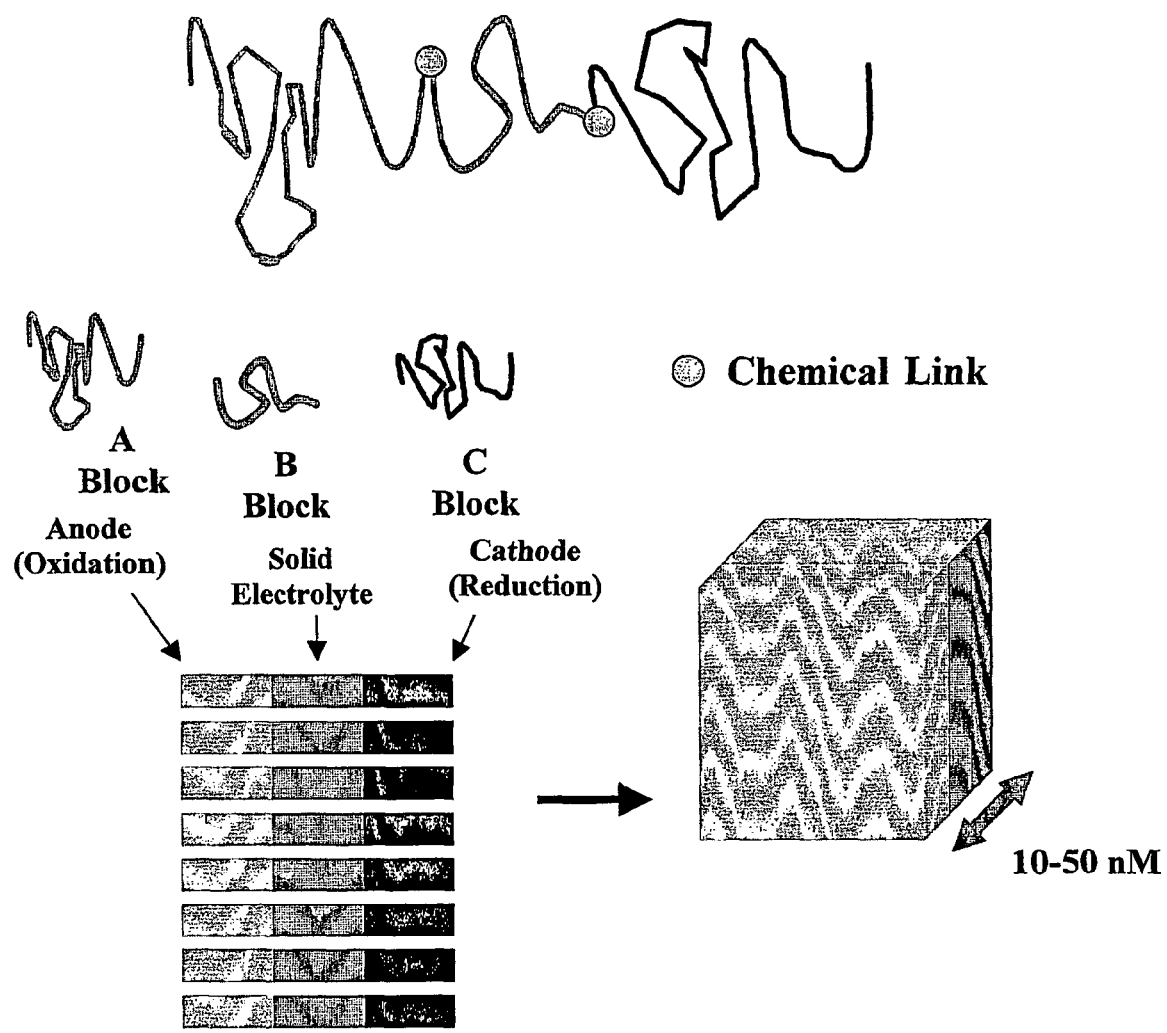
FIG. 1 illustrates the arrangement of one embodiment of the A, B, and C Block polymers of a solid-state battery of the present invention.
Figure 2:
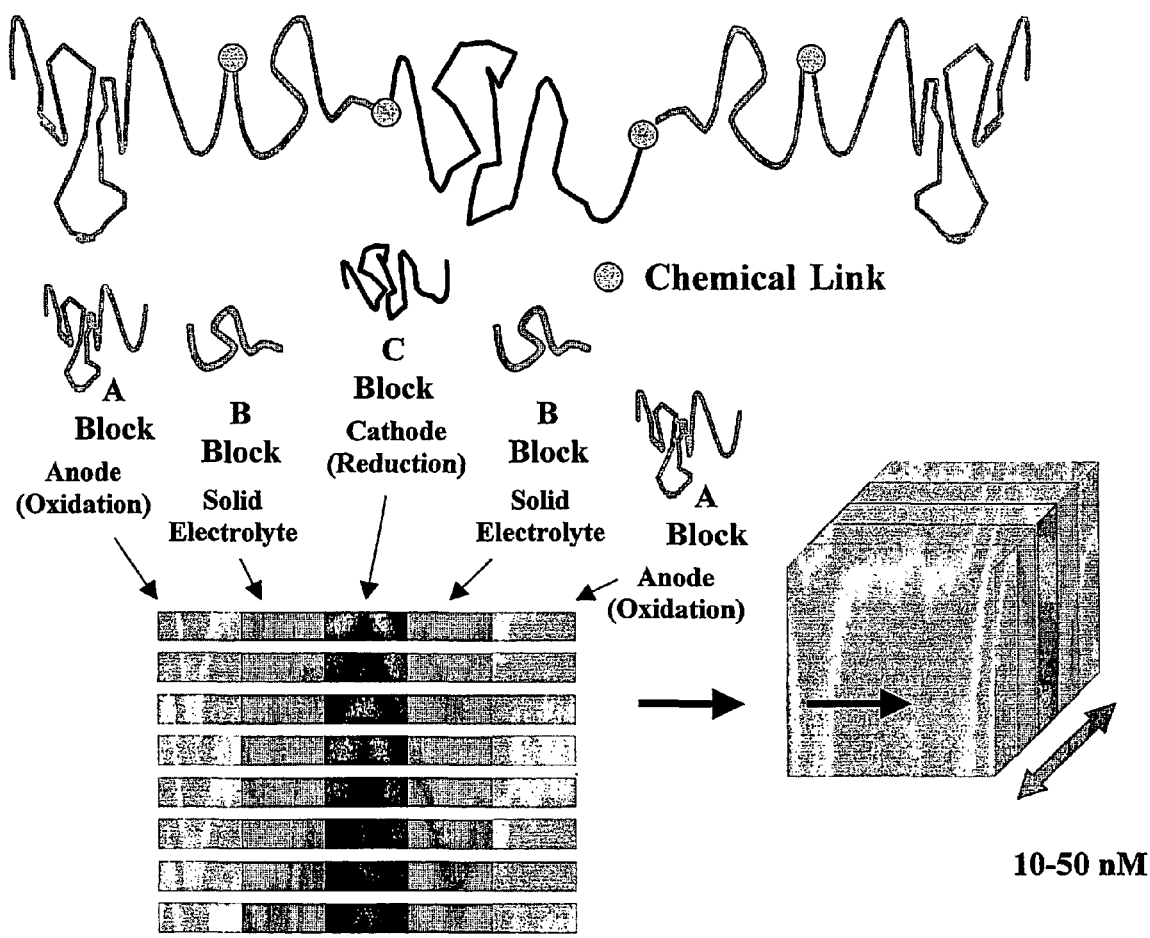
FIG. 2 illustrates the arrangement of a second embodiment of the A, B, and C Block polymers of a solid-state battery of the present invention.
Figure 3:
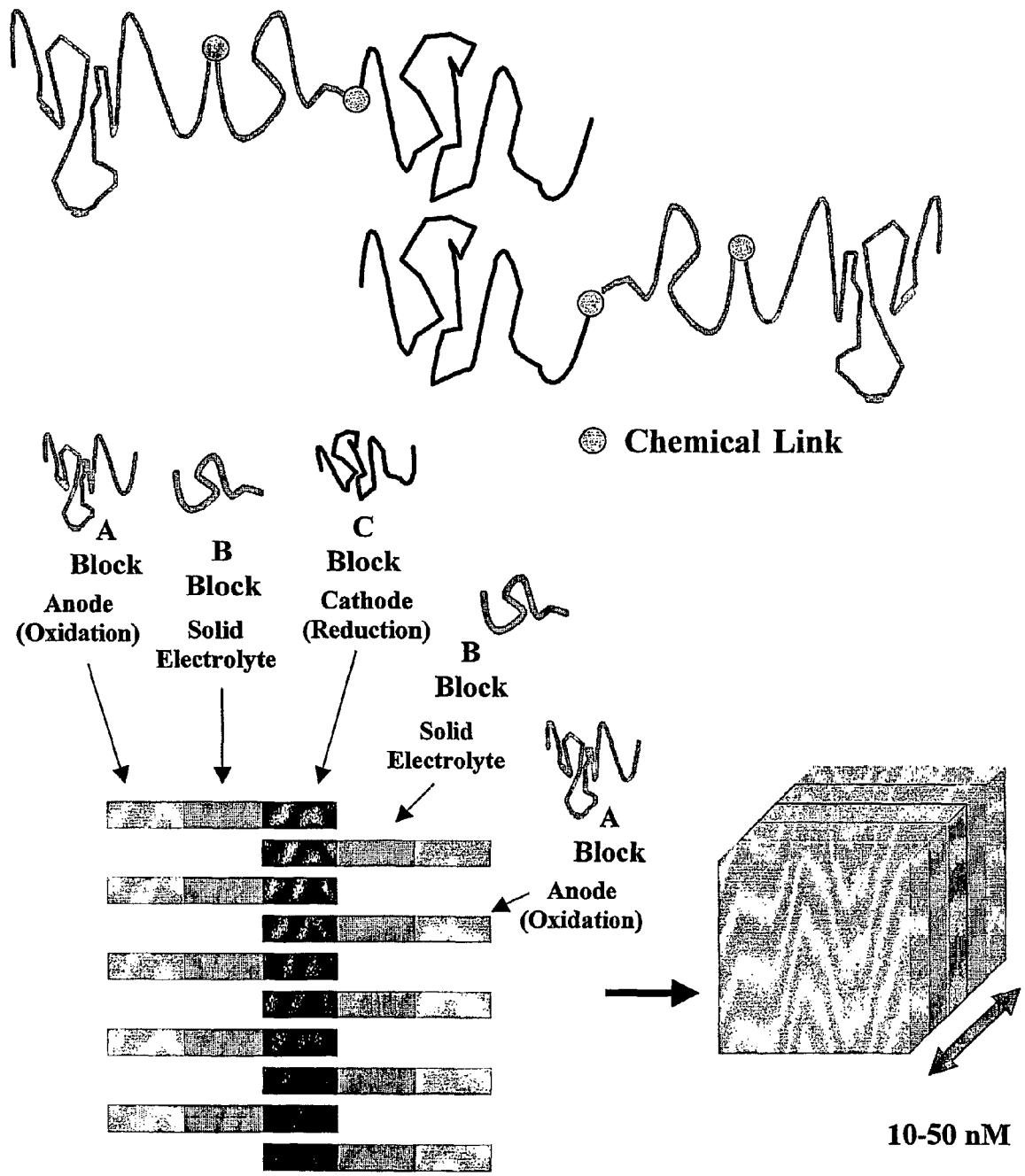
FIG. 3 illustrates the arrangement of a third embodiment of the A, B, and C Block polymers of a solid-state battery of the present invention.

The A/B/C/ Block copolymers of the present invention are preferably produced as a film, coating or sheet. In one embodiment, a single layer of each Block polymer will be employed (see FIG. 1). Alternatively, such films, coatings or sheets may be produced having more than a single layer of each Block polymer (see FIG. 2). In yet another embodiment, the film, coating or sheet may be prepared using A/B and B/C diblocks (see FIG. 3). The spaces shown between adjacent polymers in FIGS. 1–3 are merely to illustrate the polymeric A/B/C, etc. structure of the polymers; adjacent polymers may, and preferably will, contact one another.

A. The A Block Polymer

The A Block polymer of the present invention is preferably composed of an organometallic metal polymer. Suitable organometallic metal polymers include organometallic lithium polymers (e.g., polymers composed of a lithium amido end-capped norbornene monomer), and more preferably, organometallic cobalt polymers (e.g., cobalt amidonorbornene), however other similar organometallic metal monomers may be employed:

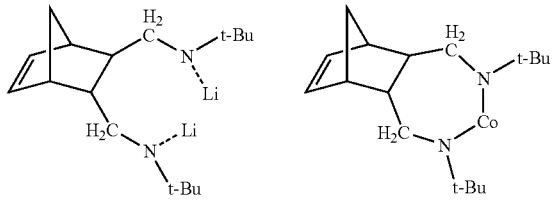

1. Lithium Amido End-Capped Norbornene Monomer

Synthesis of a lithium amido end-capped norbornene A Block monomer can be preferably accomplished with a Diels-Adler reaction between cyclopentadiene and fumarate to produce norbornene-5,6 carboxylic acid. The carboxylic acid is then reduced with $AlLiH_4$/ether to form 2-norborene dimethyl alcohol. The dialcohol is protected from further reaction with p-tolunesulfonyl chloride (in pyridine). The tolunesulfonyl chloride is displaced by t-butyl amine (t-Bu; DMF, 24 hours) to allow for chelation with lithium. n-butyl lithium is reacted with the t-butyl amine (−40° C., pentane) to form the lithium amido end-capped norbornene monomer:

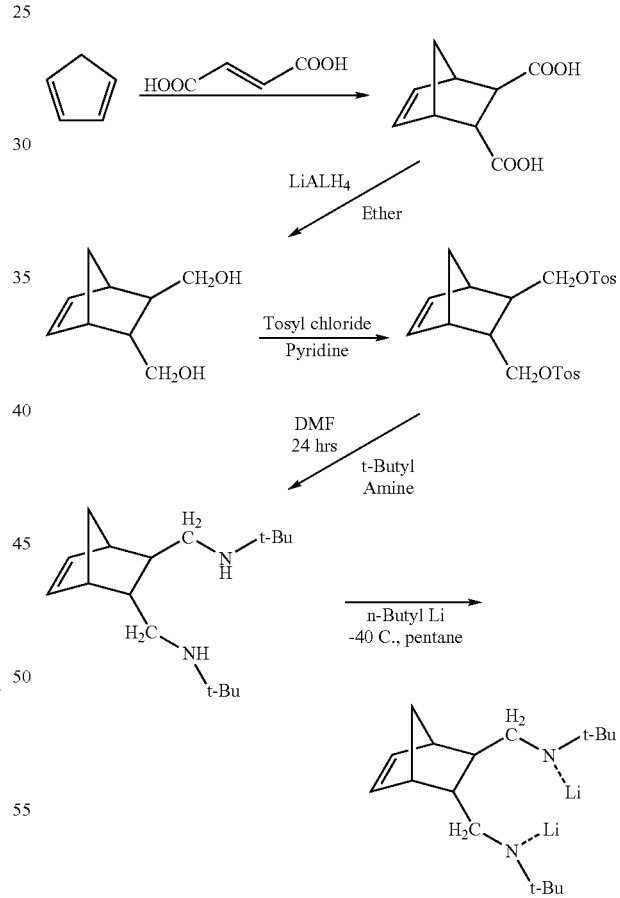

2. Cobalt Amidonorbornene Monomer

As indicated above, A Block polymers composed of organometallic cobalt are preferred over organometallic lithium. The use of organometallic cobalt is associated with greater stability and improved properties.

The cobalt amidonorbornene monomer can be synthesized through a Diels-Adler reaction between cyclopentadiene and dimethyl fumarate to produce norbornene-5,6 dimethyl ester. The dimethyl ester is then reduced with AlLiH$_4$/THF to form 2-norborene dimethyl alcohol. The dialcohol is protected from further reaction with p-tolunesulfonyl chloride (in pyridine). The tolunesulfonyl chloride is displaced by t-butyl amine (t-Bu; DMF, 24 hours) to allow for chelation with lithium. n-butyl lithium is reacted with the t-butyl amine (−40° C., pentane) to form the lithium amido end-capped norbornene monomer. The compound is then reacted with CoCl2 at −40° C. in ether to form the desired organometallic cobalt compound:

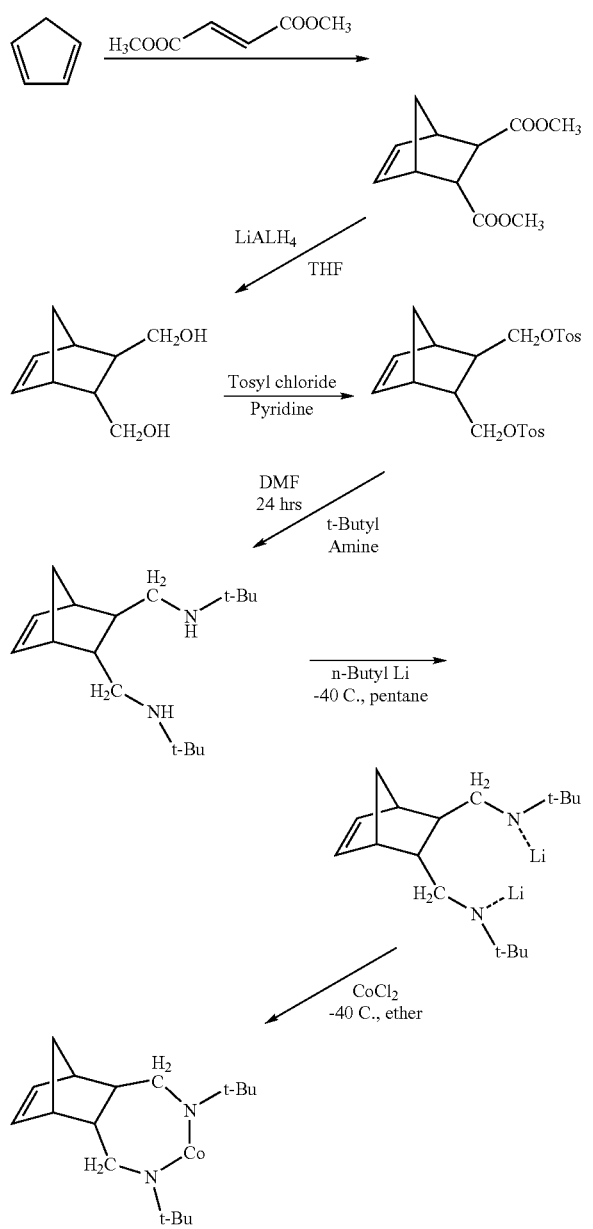

Note that in the above-described synthesis of the lithium amido end-capped monomer the COOH group is soluble in THF; in contrast, the above-described synthesis of the cobalt amidonorbornene monomer employs the dimethyl ester which is easier to purify.

The A Block monomers can be polymerized with (PYC$_3$)$_2$Cl$_2$Ru═CHR ("Grubb's Catalyst"(THF)) or Shrock's catalyst:

Mo(C$_{10}$H$_{12}$)(C$_{12}$H$_{17}$N)[OC(CH$_3$)(CF$_3$)$_2$]$_2$

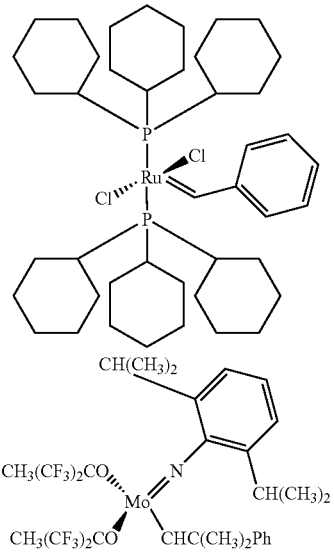

Polymerization of the organometallic lithium A Block monomer yields the following polymer:

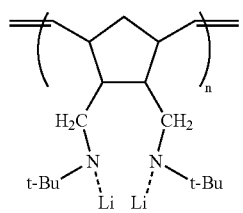

Polymerization of the organometallic cobalt A Block monomer yields the following polymer, which in the presence of water reacts to form CoO, as shown:

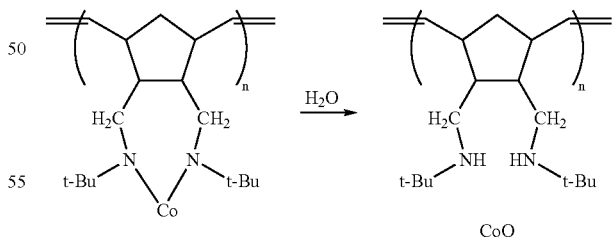

Any desired number of monomers can be employed in such polymers. Preferably, the A Block polymer will have an approximate molecular weight of greater than 10,000, and more preferably greater than 100,000.

B. The B Block Polymer

The B Block polymer of the present invention is preferably a polyethylene oxide (PEO). The monomer can be prepared from a ring closing metathesis (RCM) reaction to form an unsaturated crown ether analog, such as 12, 4 crown ether with a double bond at the carbon 1 position (tetraoxacyclodecene):

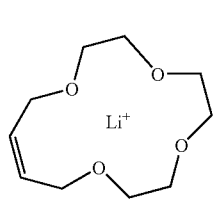

The B Block polymer is preferably formed from norbornene-5,6 dimethyl ester monomers. The monomer used in this block polyethylene oxide (PEO). The monomer can be prepared from a ring closing metathesis (RCM) reaction to form an unsaturated crown ether analog, such as 12, 4 crown ether with a double bond at the carbon 1 position.

Alternatively, the unsaturated crown ether analog may be synthesized as follows:

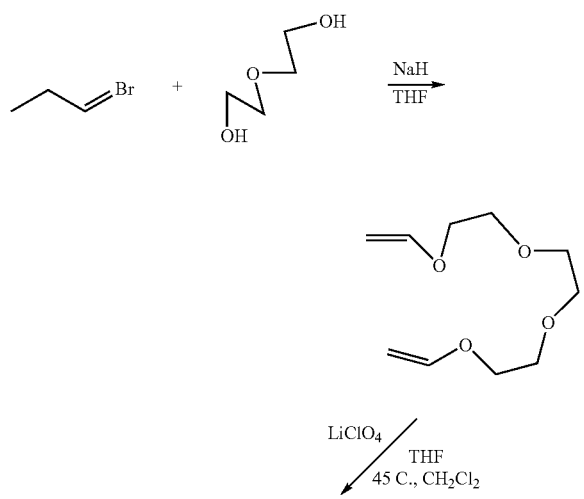

Polymerization can be performed with Grubb's catalyst and Schrock's catalyst, with molecular weights of each block of 50 kDa. Residual ruthenium from the deactivated catalyst would isomerize the monomer during distillation, encumbering polymerization. To avoid this problem, a water-soluble phosphine can be employed to remove the ruthenium and allow the monomer to be purified:

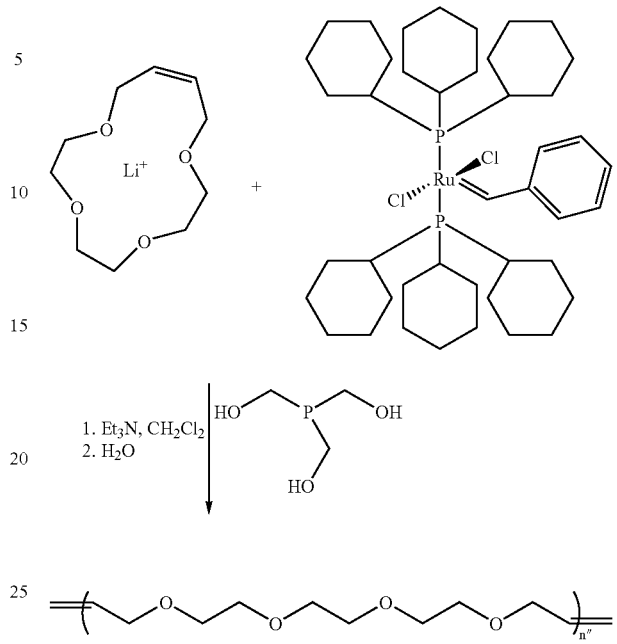

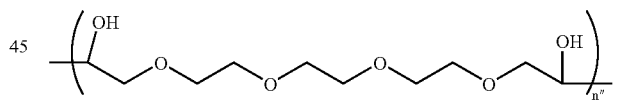

Any desired number of monomers can be employed in such polymers. Preferably, the B Block polymer will have an approximate molecular weight of greater than 10,000, and more preferably greater than 100,000.

In addition, the unique form of the ROMP derived PEO allows several subsequent reactions to be performed on the double bonds. Epoxidation and hydrolysis of the double bonds can give rise to various functionalities along the backbone of the PEO, including, but not limited to: OH, $CF_3SO_3$ (triflate salt), $OCH_3$.

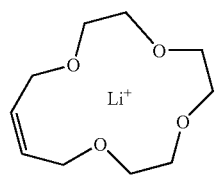

C. The C Block Polymer

The C Block polymer of the present invention is preferably composed of a functionalized norbornene (such as poly(norbornene carboxylic acid)) and utilizes a hydride reduction. The monomer can be a norbornene 5,6 dimethyl ester:

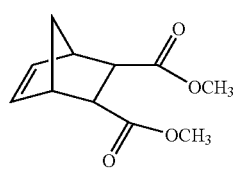

Such a monomer can be formed as shown below:

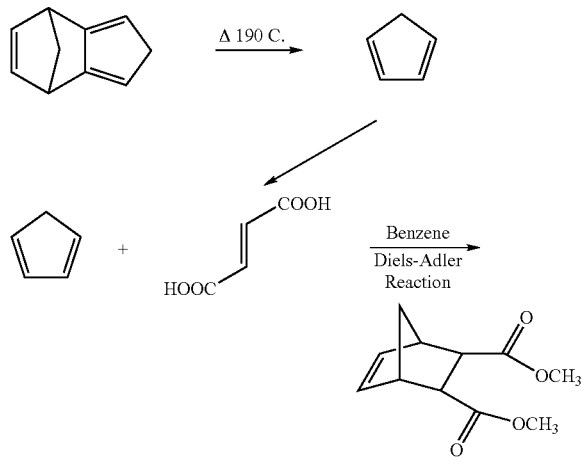

More preferably, such a monomer can be formed using the following scheme:

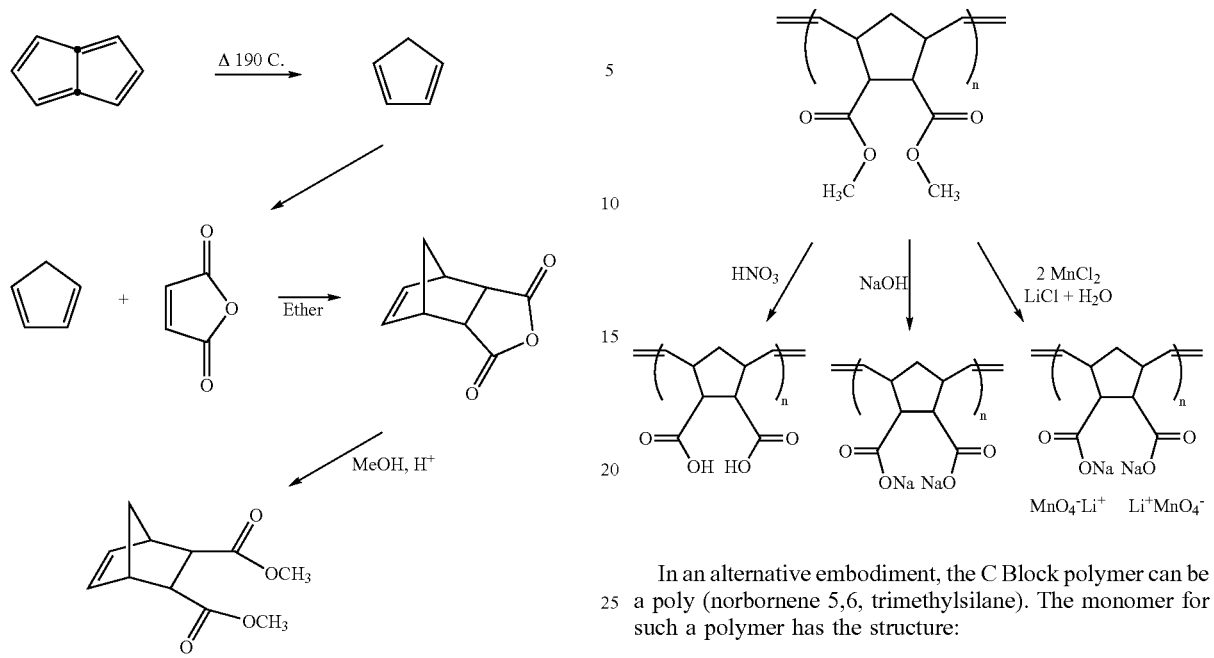

Upon polymerization, C Block polymers of such a monomer will have the following structure:

This material can be incorporated as MnCl$_2$ with LiCl and hydrolyzed and oxidized with water:

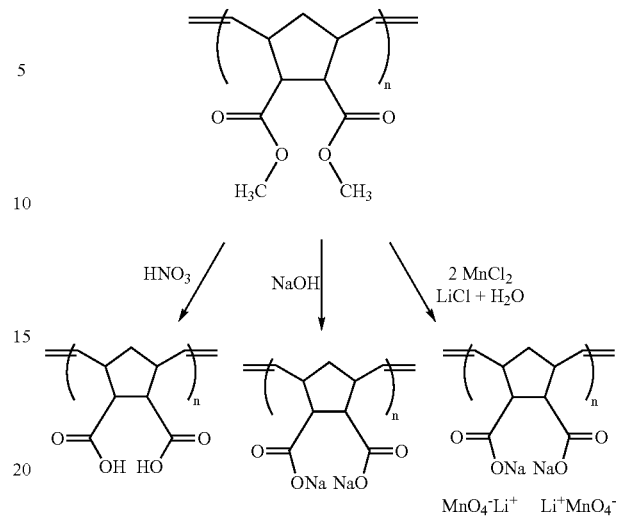

In an alternative embodiment, the C Block polymer can be a poly (norbornene 5,6, trimethylsilane). The monomer for such a polymer has the structure:

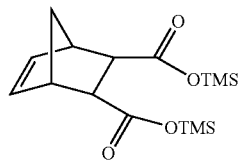

Such a monomer can be formed as shown below:

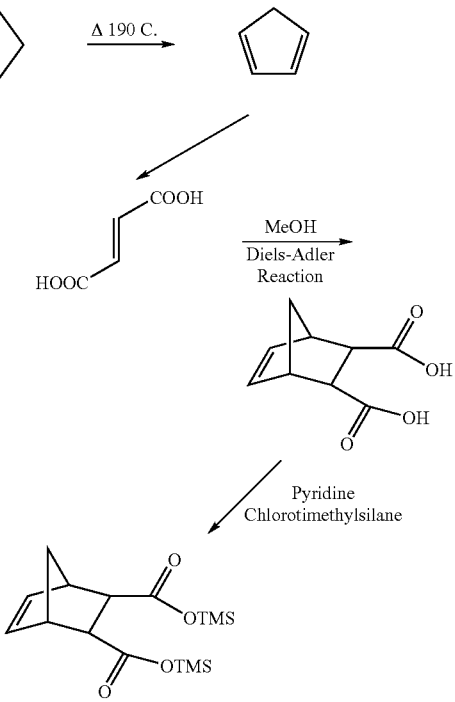

Upon polymerization, C Block polymers of such a monomer will have the following structure:

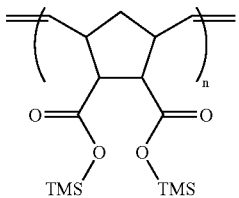

This polymer may be processed to incorporate lithium as shown below:

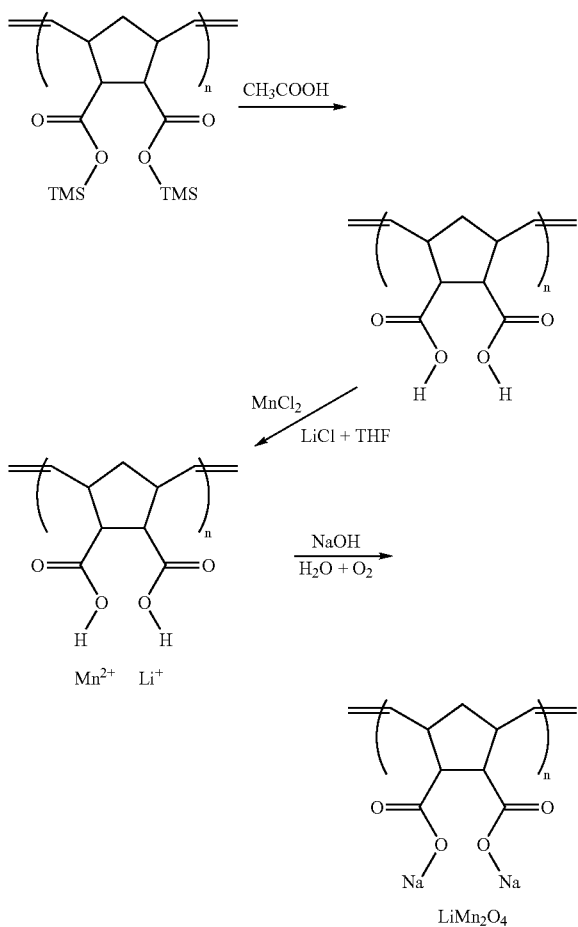

Alternatively, other cathode materials, such as $TiS_2$ and $LiMn_{2-x}Co_xO_4$ may be employed. These materials will be incorporated as inorganic salts, then reacted to form nanoparticles in the phase separated domains of the C Block. Verification of the chemical structure can be obtained using NMR and the molecular weight of the polymer can be determined by GPC.

Any desired number of monomers can be employed in such polymers. Preferably, the C Block polymer will have an approximate molecular weight of greater than 10,000, and more preferably greater than 100,000.

Figure 4:
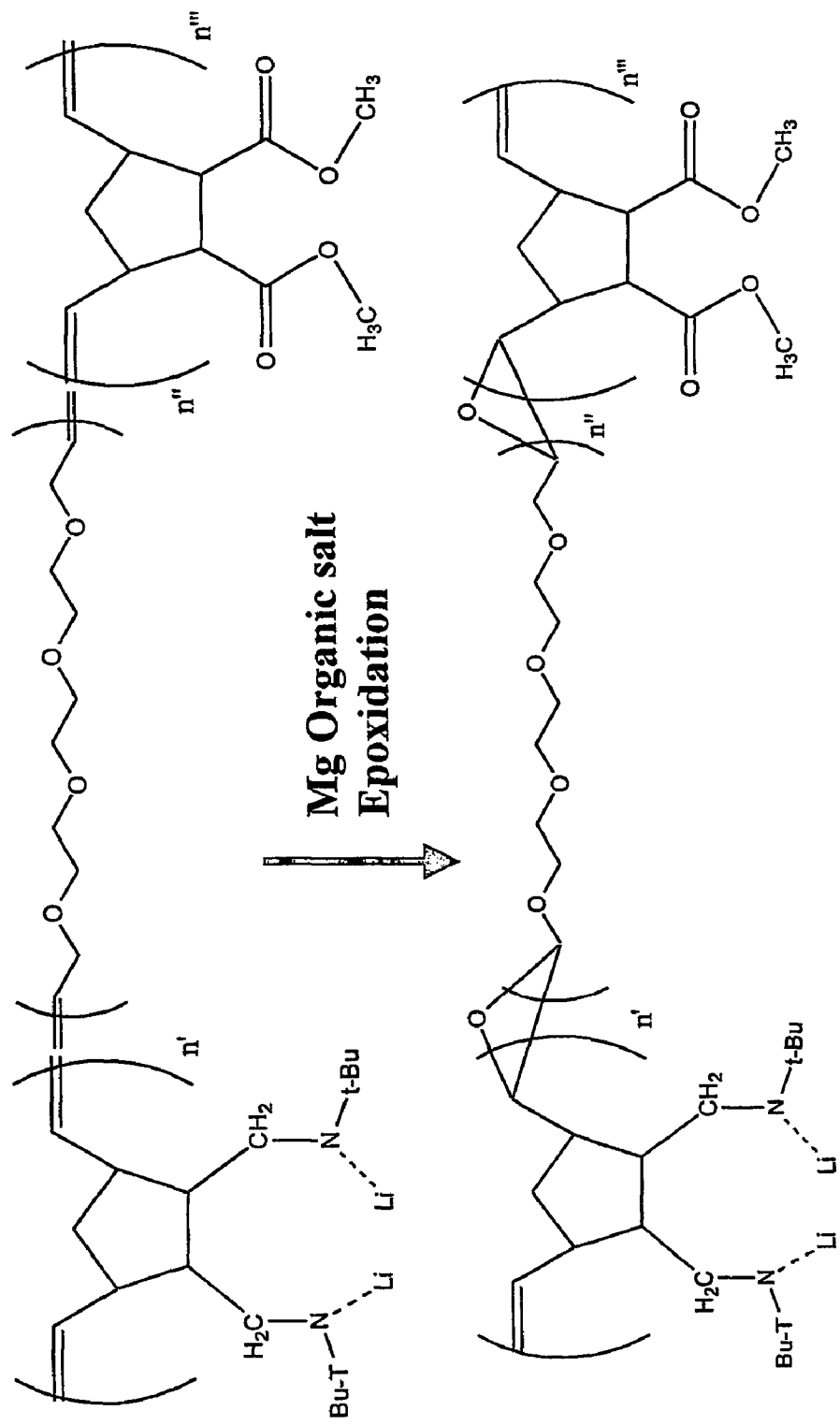
FIG. 4 illustrates the structure of an A/B/C triblock copolymer for an organometallic lithium A Block polymer, and its epoxidation in the presence of a Mg organic salt.
Figure 5:
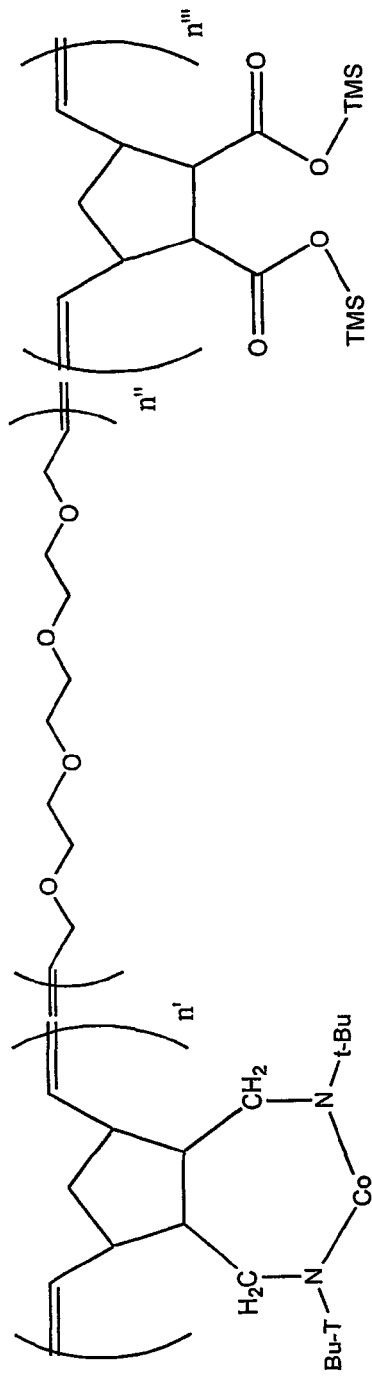
FIG. 5 illustrates the structure of an A/B/C triblock copolymer for an organometallic cobalt A Block polymer.
Figure 6:
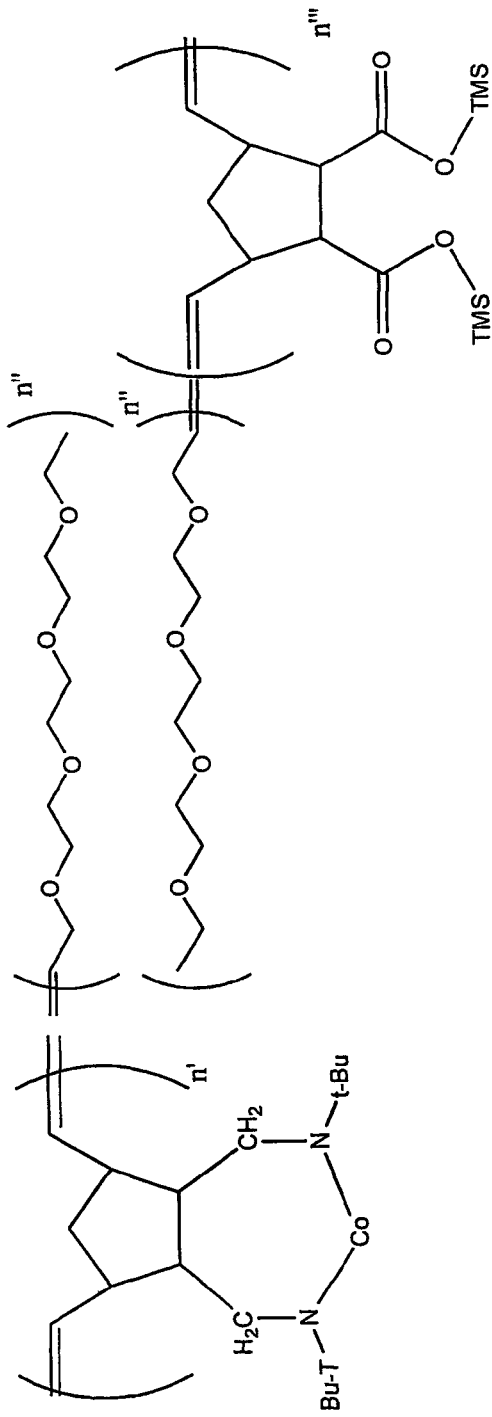
FIG. 6 illustrates the structure of an A/B and B/C diblock copolymer for an organometallic cobalt A Block polymer.

The general structure of a triblock polymer using a lithium amido end-capped norbornene monomer as the basis for the A Block polymer, and its epoxidation in the presence of an Mg organic salt, are shown in FIG. 4. The general structure of a triblock polymer using a cobalt norbornene monomer as the basis for the A Block polymer is shown in FIG. 5. In FIGS. 4 and 5, n', n", and n''' denote the number of monomer units of each of the A, B, and C Block polymers respectively, and may be the same or different, and may vary independently of one another. Polymerization occurs sequentially, for example, the A Block monomer is polymerized, then the B Bblock monomer is added to the "living A chain," to add a B Block polymer, then a C block monomer is added to the "living AB chain," to form the ABC triblock polymer.

II. Production and Uses of the Unique Polymeric Battery System of the Present Invention In conventional liquid electrolyte batteries, most ions conduct current, and therefore high conductivity is exhibited. Conventional batteries have, however, no long-range order and are not selective towards different ions. In contrast, the solid-state batteries of the present invention employ mostly alkali earth ions to conduct current. Conductivity is temperature dependent, and may operate due to the long-range order of the polymer blocks within the triblock arrangement of polymers. Additionally, the batteries of the present invention can operate through the conductance of a single ionic species. The battery functions better at elevated temperature, due mostly to the increased ionic conductivity of the PEO.

The polymer battery systems of the present invention have the advantage that they can be produced as thin films, coatings, sheets, etc. that can be wound into coils or processed as sheets to form batteries. In one embodiment of the invention, such battery systems will be configured as an A/B/C triblock (see, for example, FIG. 1), alternatively other configurations, such as an A/B/C/B/A pentablock (see, for example, FIG. 2), or as one or more series of A/B and B/C diblocks (see, for example, FIG. 3). Such diblocks configurations may be fixed in contiguous contact, such that the A, B and C polymers permit an electrical current to flow. Alternatively, the diblock configurations can be configured so as to be positionable with respect to one another such that electrical current will not flow until the diblocks are placed in contact with one another (i.e., as a capacitor to effect current flow).

The polymer battery systems of the present invention may comprise single batteries, or may comprise two or more batteries connected to one another in series or in parallel in order to provide enhanced voltage or current.

Due to the absence of liquid electrolytes, the formed sheets are not subject to leakage, and thus are more reliable than conventional batteries. Additionally, they may be used to position the power source near devices or circuits that are to be powered by the battery, thereby reducing the amount of wiring, levels of interconnects, and resistance losses associated with operating the device.

The devices that can be made using the polymers of the present invention preferably comprise a polymer in which the electrodes are powered through the polymer chain. A top electrode that is miscible with the anode and an electrode specific for the cathode allows for recharging of the battery. Such film, coating or sheet may be discrete from the structure of the device being powered (as is the case for standard batteries), or may be fashioned so as to be integral to the structure of the device. For example, the battery systems of the present invention can be fused, deposited or otherwise associated with the housing or case of a device (e.g., the plastic housing of a portable telephone), or with a structural component of the device (e.g., a portion of the frame, etc. of an automobile).

The electrochemically driven size confinement of the metal particles of the batteries of the present invention enhances electrochemical activity, and provides the battery with better cycling performance (i.e., performance upon repeated charging and discharging). The reduced electrochemical cell length of the batteries of the present invention improves conductivity relative to conventional batteries.

In one embodiment, such battery systems will comprise leads or other connectors to permit the recharging of the battery. Alternatively, the battery systems may be configured as disposable power sources, lacking such leads.

The battery systems of the present invention have particular utility in powering solid-state devices, such as computers, radios, televisions, DVD playersetc., but may also be used to power any other electrically powered device. As used herein the term "computer" is intended to refer not only to conventional mainframe, personal computers, or laptop computers (i.e. mobile personal computers), but also to any device capable of processing or storing digital data (e.g., personal digital assistants (PDAs), global positioning systems, pagers, two-way radios, telephones (especially cellular telephones), cameras (still picture, motion picture or broadcast), etc.). In one embodiment, such battery systems will be employed as the main power source, so as to render the device portable. Alternatively, the battery systems of the present invention may be employed as a "back-up," or auxiliary power source.

Having now generally described the invention, the same will be more readily understood through reference to the following examples, which are provided by way of illustration, and are not intended to be limiting of the present invention, unless specified.

EXAMPLE 1

A/B/C Triblock Polymer Using a Lithium Amido End-capped Norbornene Monomer

To illustrate the present invention, an A/B/C triblock polymer using a lithium amido end-capped norbornene monomer as the basis for the A Block polymer, polyethylene oxide (PEO) as the B Block polymer, and poly(norbornene carboxylic acid)) as the C Block polymer.

The Li-capped monomer provides a phase-separated domain containing lithium to act as the anode. The electrochemical cell reactions of the battery involve the formation of lithium at the cathode: $Li^+ + e^- \rightarrow Li$, and the formation of lithium ion at the anode: $Li \rightarrow Li^+ + e^-$, so as to produce a direct current. The A Block polymer provides the lithium metal, the B Block polymer provides the electrolyte, and the C Block polymer provides $Li_{1-x}Mn_2O_4$ so that the overall electrochemical cell reaction is: $Li_x \rightarrow Li_{1-x}Mn_2O_4$; $E_{cell} = 3.60$ V.

The individual A, B, and C Block polymers are prepared as described above. The Anode Block has an approximate molecular weight of 400,000; the Electrolye Block has an approximate molecular weight of 500,000; the Cathode Block has an approximate molecular weight of 400,000.

A battery having a surface of 9 cm² and a thickness of 100 μM is prepared. Assuming that the cells have lamellae of 300 Å, conductivities of: $\sigma_A = 2 \times 10^{-10}$ S/cm, $\sigma_B = 4 \times 10^{-5}$ S/cm, $\sigma^C = 2 \times 10^{-10}$ S/cm are attained. The predicted charge capacity of the battery is 5.15 mAH/g of material.

EXAMPLE 2

A/B/C Triblock Polymer Using a Cobalt Norbornene Monomer

To illustrate the present invention, an A/B/C triblock polymer using a cobalt norbornene monomer as the basis for the A Block polymer, polyethylene oxide (PEO) as the B Block polymer, and poly(norbornene carboxylic acid)) as the C Block polymer. The cathode reaction of the battery is:

The anode reaction of the battery is:

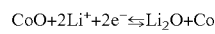

Thus, lithium ions flow to the A Block polymer, and electrons flow to the C Block polymer. The formation and decomposition of lithium dioxide is fully reversible. The battery employs an electrochemically driven size confinement of metal particles to enhance activity and provide better battery cycling performance.

Figure 7:
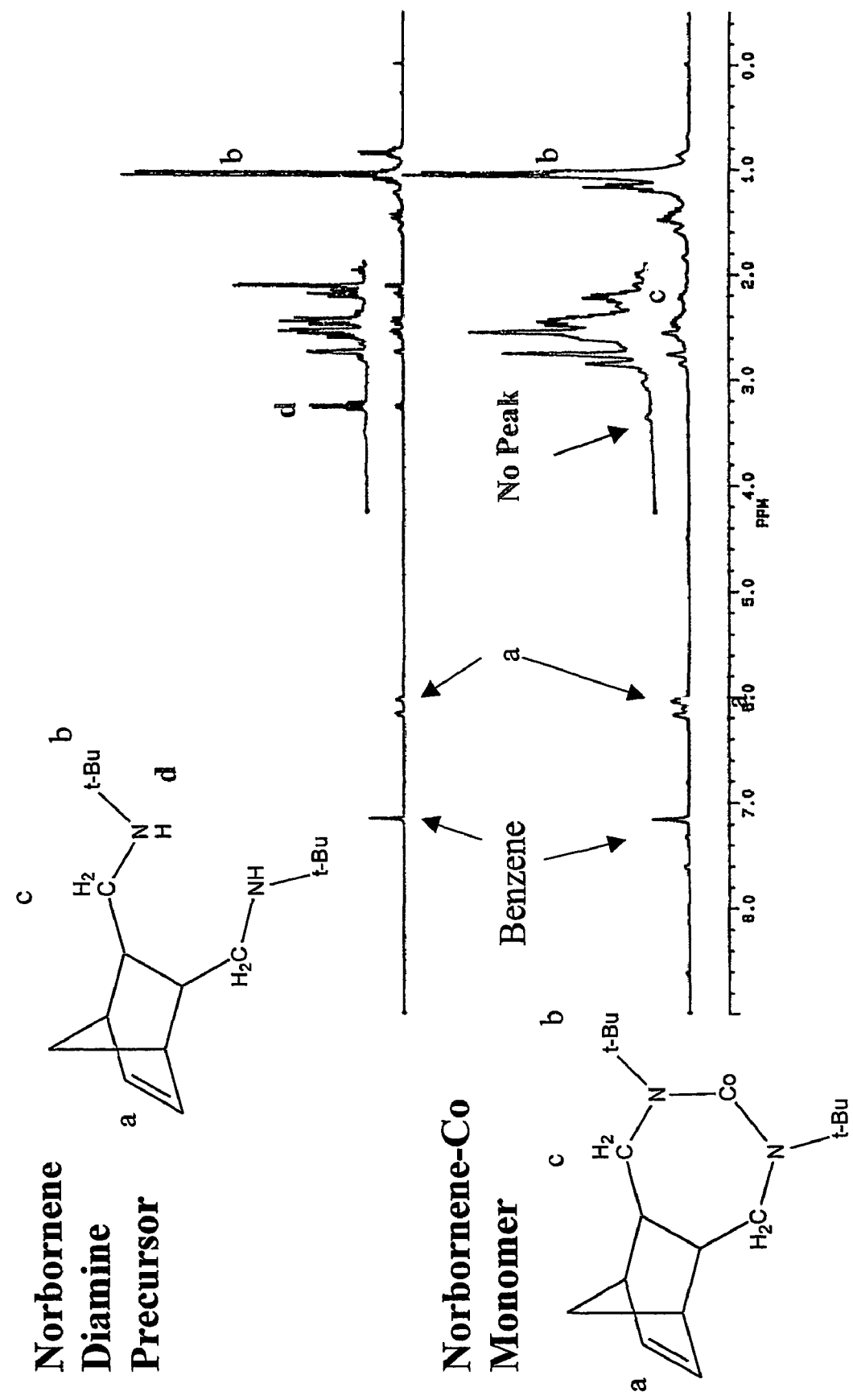
FIG. 7 shows the NMR spectra of the norbornene diamine precursor and of a norbornene-Co monomer.
Figure 8:
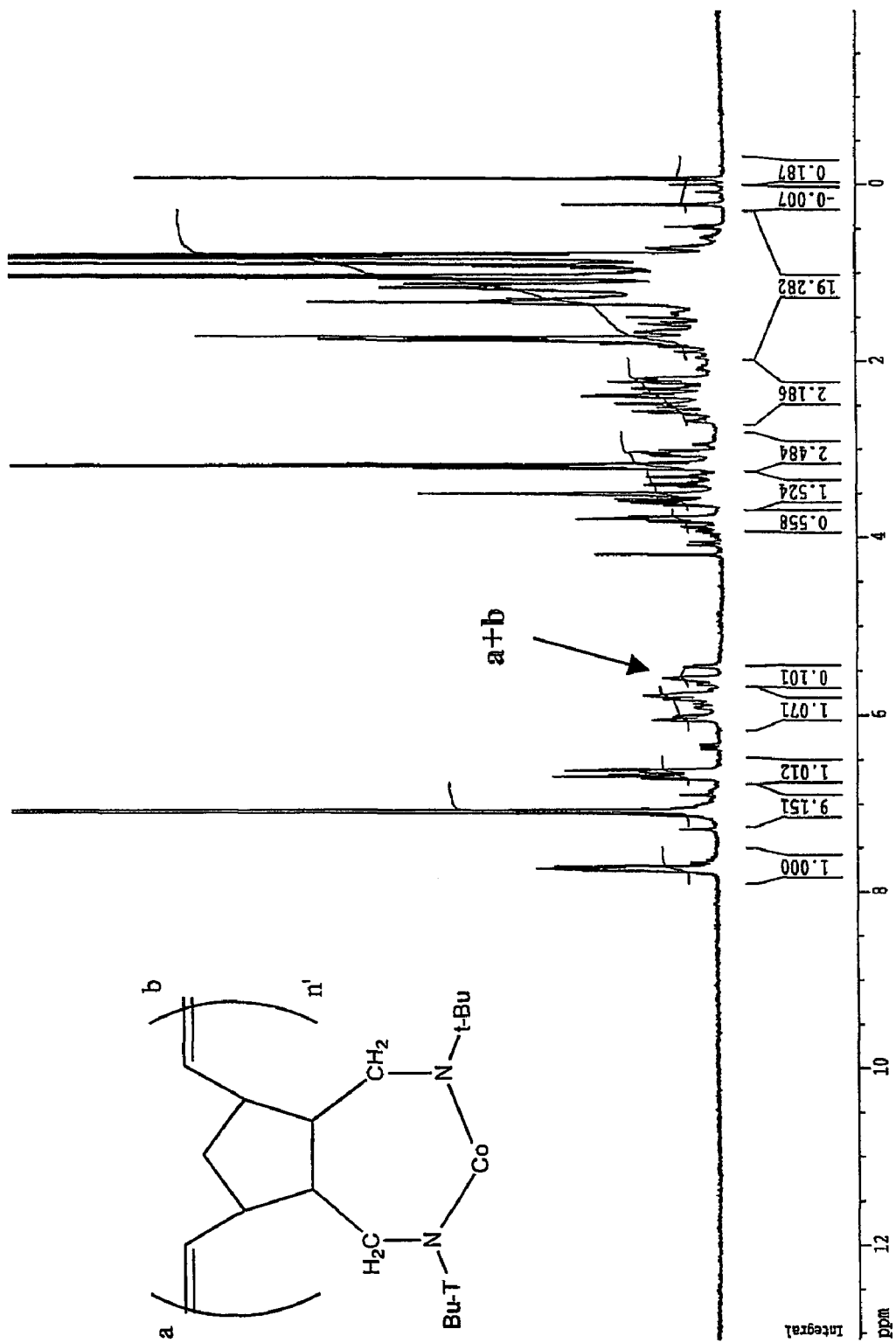
FIG. 8 shows the NMR spectra of an A Block homopolymer of norbornene-Co.
Figure 9:
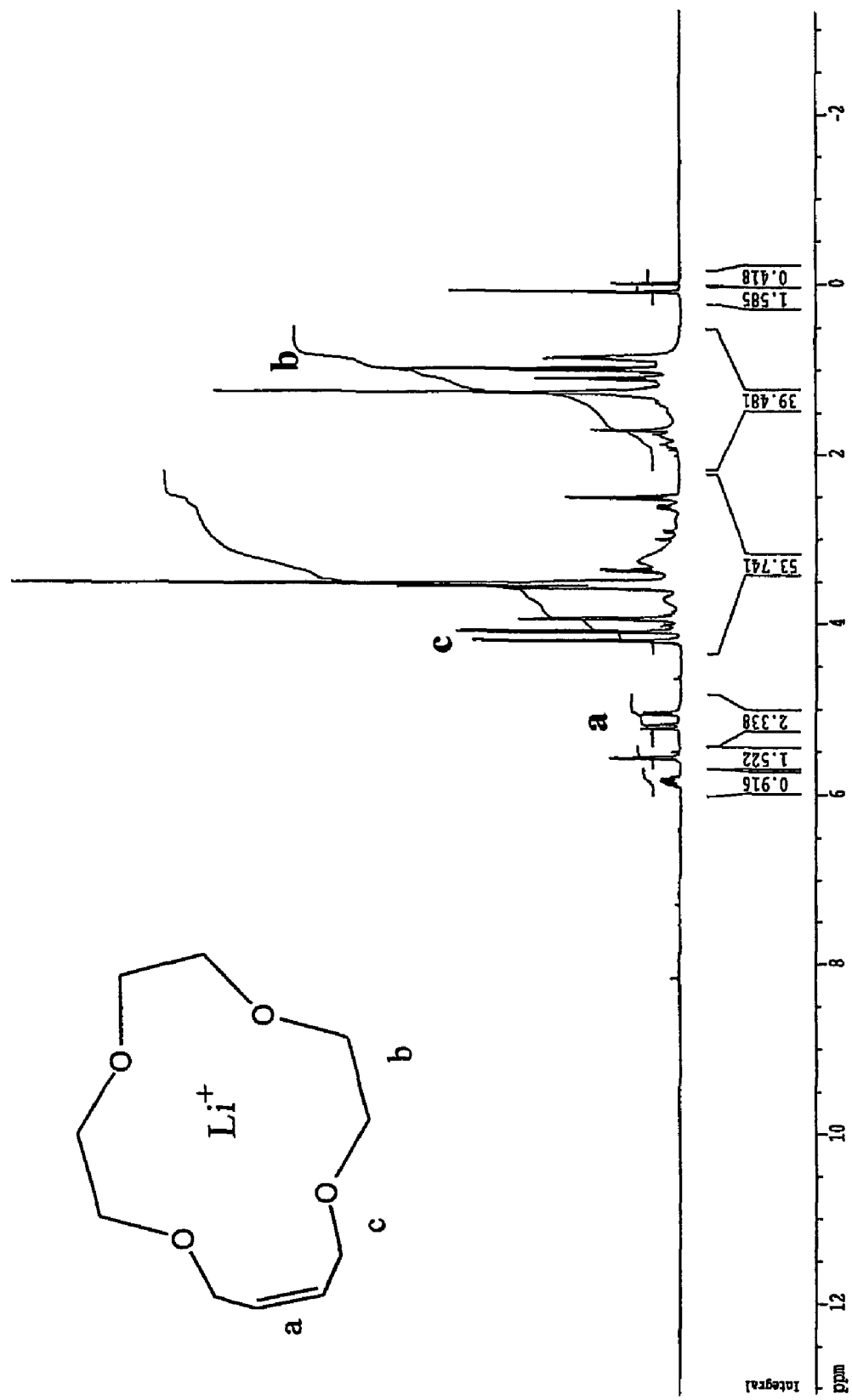
FIG. 9 shows the NMR spectra of a tetraoxacyclodecene B Block monomer.
Figure 10:
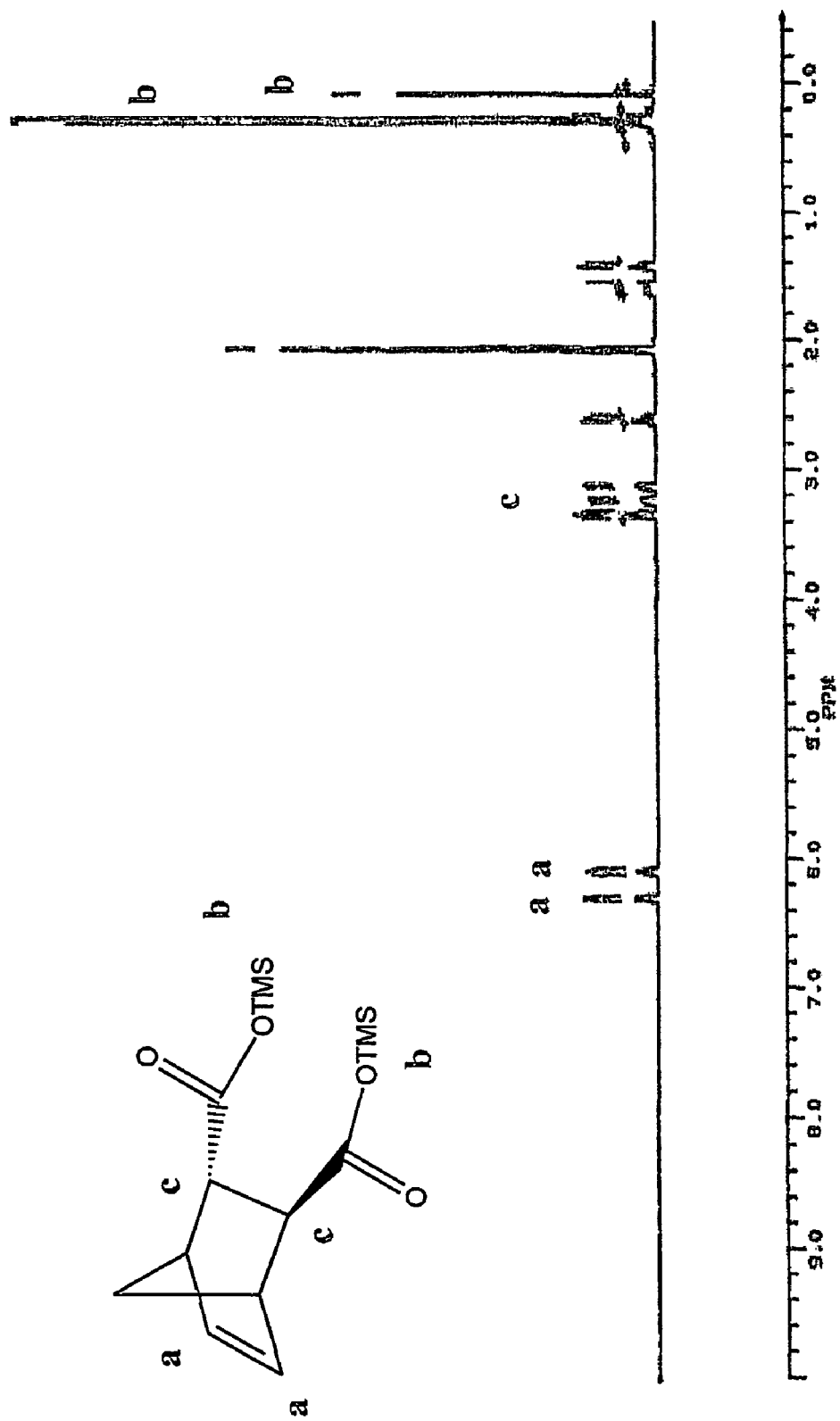
FIG. 10 shows the NMR spectra of a C Block monomer norbornene carboxylic acid trimethylsilane.
Figure 11:
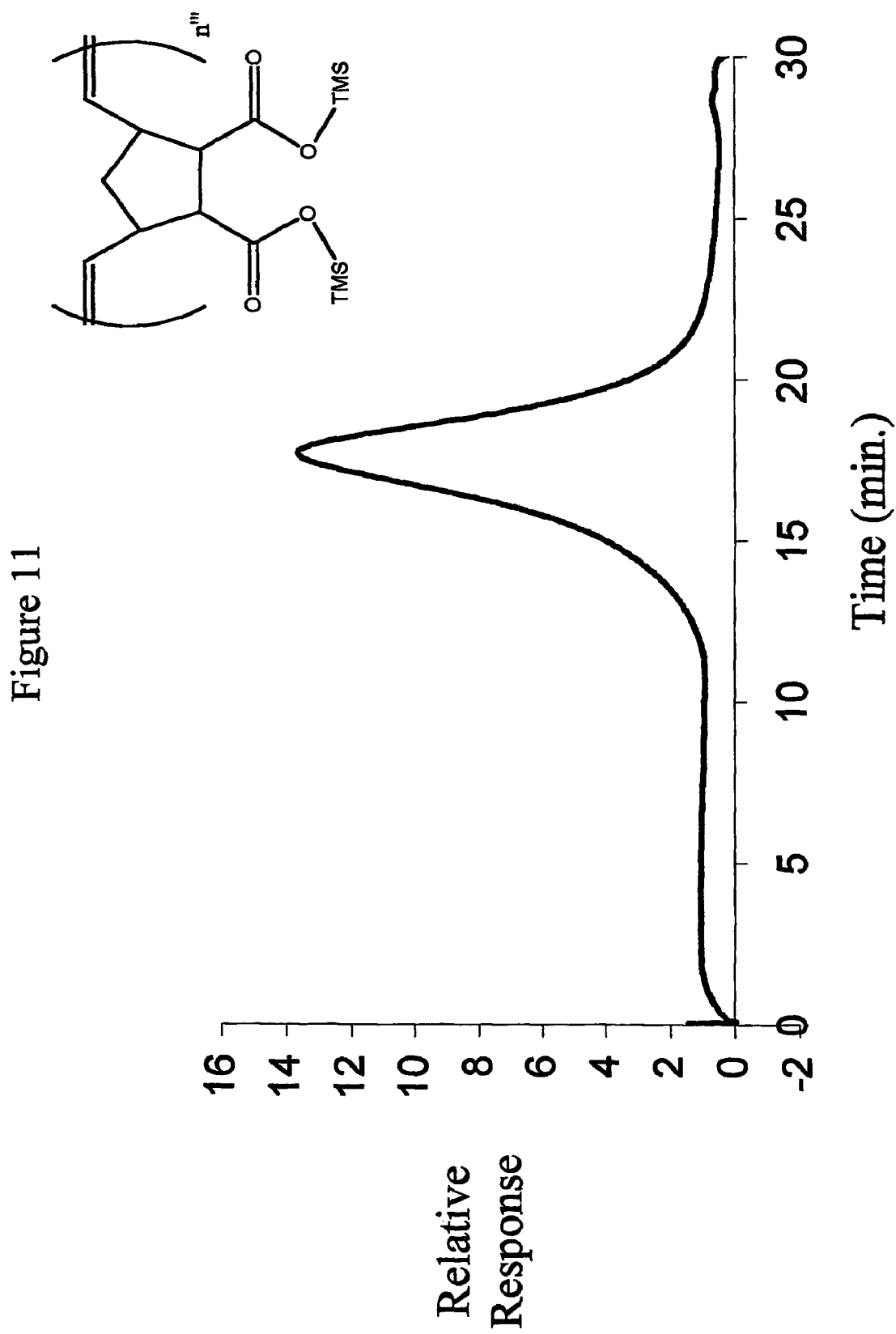
FIG. 11 shows the GPC analysis of a C Block Homopolymer.

FIG. 7 shows the NMR spectra of the norbornene diamine precursor and of the A Block norbornene-Co monomer. FIG. 8 shows the NMR spectra of the A Block homopolymer of norbornene-Co. FIG. 9 shows the NMR spectra of the tetraoxacyclodecene B Block monomer. FIG. 10 shows the NMR spectra of the C Block monomer norbornene carboxylic acid trimethylsilane. FIG. 11 shows the GPC analysis of the C Block Homopolymer. The Figure plots the relative response vs. time in minutes. The polymer had an $M_n = 362,185$, a $M_w = 597,050$, and a PDI of 1.64.

A battery having a surface of 9 cm² and a thickness of 100 μM is prepared. Assuming that the battery had a 300 Å lamellae and no metal loading, conductivities of: $\sigma^A = 2 \times 10^{-10}$ S/cm, $\sigma_B = 4 \times 10^{-5}$ S/cm, $\sigma_C = 2 \times 10^{-10}$ S/cm are attained. The battery had a 3.6 V source. The predicted charge capacity of the battery is 5.15 mAH/g of material.

All publications and patent applications mentioned in this specification are herein incorporated by reference to the same extent as if each individual publication or patent application had been specifically and individually indicated to be incorporated by reference. The discussion of the background to the invention herein is included to explain the context of the invention. Such explanation is not an admission that any of the material referred to was published, known, or part of the prior art or common general knowledge anywhere in the world as of the priority date of any of the aspects listed above.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A solid-state battery system comprising a battery comprising an anode polymer chemically linked to an electrolyte polymer, which is chemically linked to a cathode polymer, wherein said anode polymer has the structure:

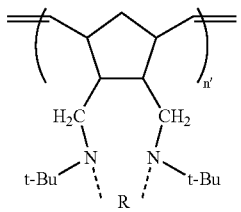

wherein n' is greater than 50, and R is a divalent and/or transition metal or an alkali earth metal atom or is two monovalent metals or alkali earth metals; wherein said electrolyte polymer is a polyethylene oxide (PEG) polymer having the structure:

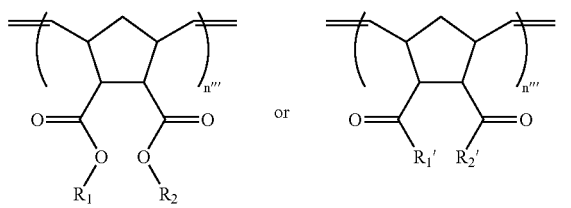

wherein n" is greater than 50; and wherein said cathode polymer has the structure:

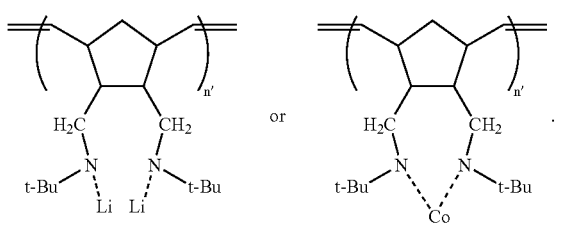

wherein n'" is greater than 50, and wherein R1 and R2 may be the same or different, and are selected from the group consisting of TMS, CH3, H, or Na; wherein R1' and R2' may be the same or different, and are selected from the group consisting of or may be OTMS, $OCH_3$, OH, ONa, and $NH_3$.

2. The battery system of claim 1, wherein said anode polymer has the structure:

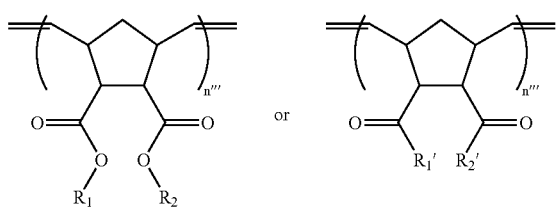

3. The battery system of claim 1, wherein said battery is a film, coating or sheet.

4. The battery system of claim 2, wherein said battery is a film, coating or sheet.

5. A computer powered by a battery system comprising a battery comprising an anode polymer chemically linked to an electrolyte polymer, which is chemically linked to a cathode polymer, wherein said anode polymer has the structure:

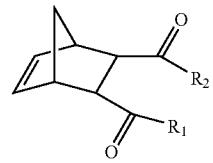

wherein n' is greater than 50, and R is a divalent and/or transition metal or an alkali earth metal atom or is two monovalent metals or alkali earth metals; wherein said electrolyte polymer is a polyethylene oxide (PEO) polymer having the structure:

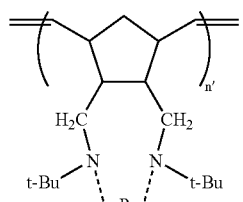

wherein n" is greater than 50; and wherein said cathode polymer has the structure:

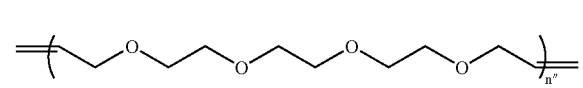

wherein n'" is greater than 50, and wherein R1 and R2 may be the same or different, and are selected from the group consisting of TMS, CH3, H, or Na; wherein R1' and R2' may be the same or different, and are selected from the group consisting of or may be OTMS, $OCH_3$, OH, ONa, and $NH_3$.

6. The computer of claim 5, wherein said anode polymer has the structure:

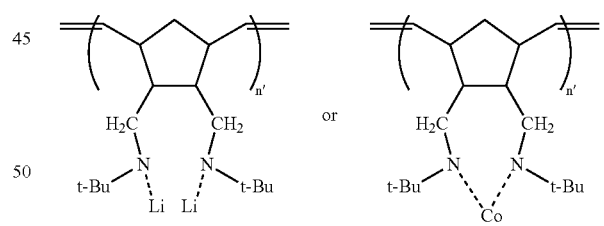

7. The computer of claim 5, wherein said computer is a cellular telephone, pager, or two-way radio.

8. The computer of claim 6, wherein said computer is a cellular telephone, pager, or two-way radio.

9. The computer of claim 5, wherein said computer is a personal computer, PDA, or laptop computer.

10. The computer of claim 6, wherein said computer is a personal computer, PDA, or laptop computer.

11. The computer of claim 5, wherein said computer is a global positioning system or camera.

12. The computer of claim 6, wherein said computer is a global positioning system or camera.

* * * * *

UNITED STATES PATENT AND TRADEMARK OFFICE
CERTIFICATE OF CORRECTION

PATENT NO.         : 7,063,918 B2
APPLICATION NO. : 10/380697
DATED                  : June 20, 2006
INVENTOR(S)        : Peter Kofinas and Steven Bullock It is certified that error appears in the above-identified patent and that said Letters Patent is hereby corrected as shown below:

At Column 21, line 16, "PEG" should read --PEO--
At Column 21, lines 20-27, the depicted chemical structures should be replaced with the following structure:

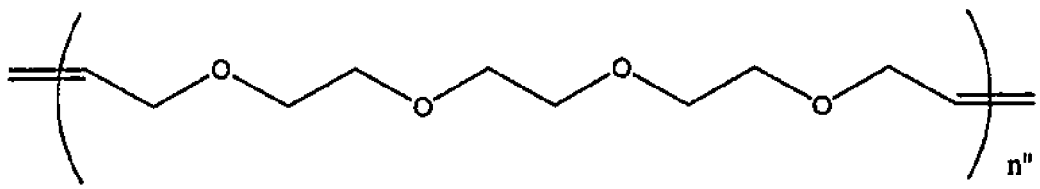

At Column 21, lines 31-41, the depicted chemical structure should be replaced with the following structure:

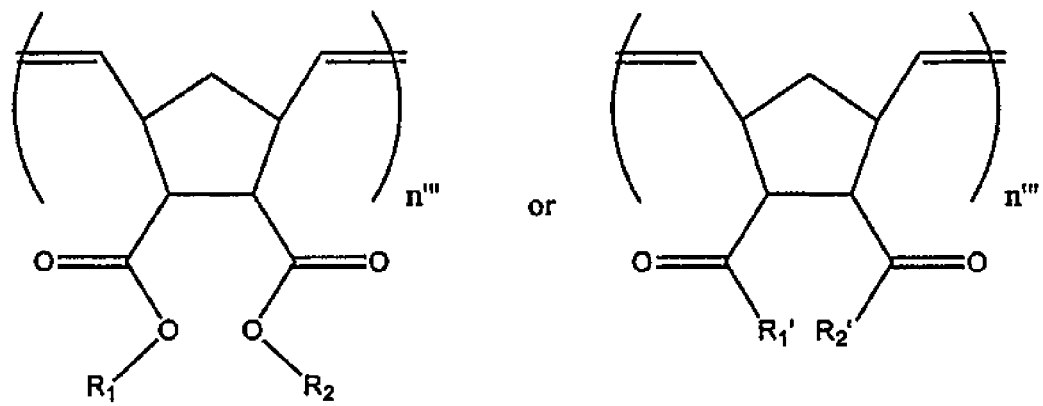

At Column 21, lines 51-60, the depicted chemical structure should be replaced with the following structure:

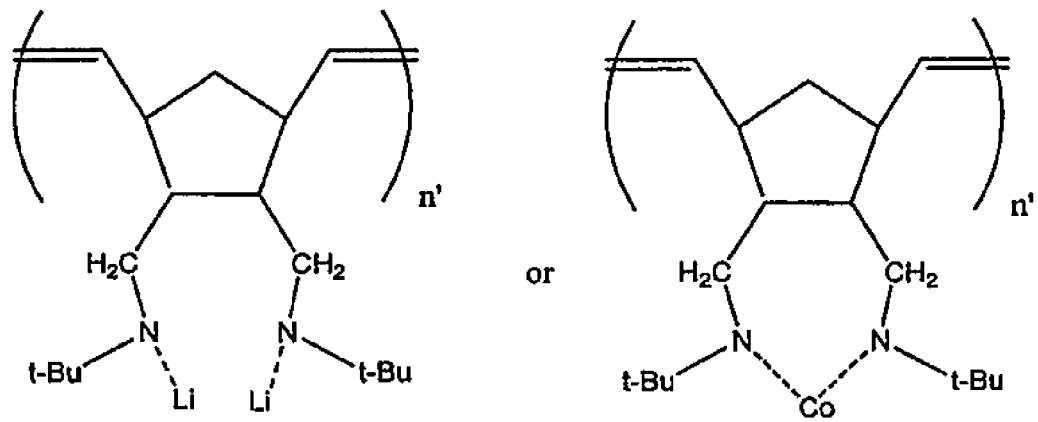

UNITED STATES PATENT AND TRADEMARK OFFICE
CERTIFICATE OF CORRECTION

PATENT NO. : 7,063,918 B2
APPLICATION NO. : 10/380697
DATED : June 20, 2006
INVENTOR(S) : Peter Kofinas and Steven Bullock It is certified that error appears in the above-identified patent and that said Letters Patent is hereby corrected as shown below:

At Column 22, lines 4-11, the depicted chemical structure should be replaced with the following strucuture:

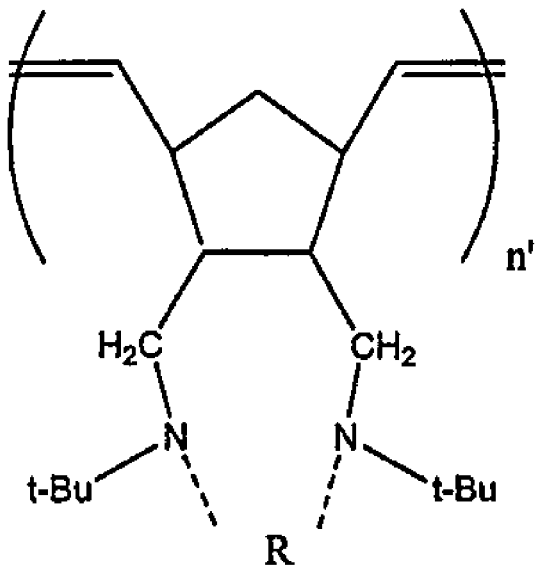

At Column 22, line 15, "PEG" should read --PEO--
At Column 22, lines 17-26, the depicted chemical structure should be replaced with the following structure:

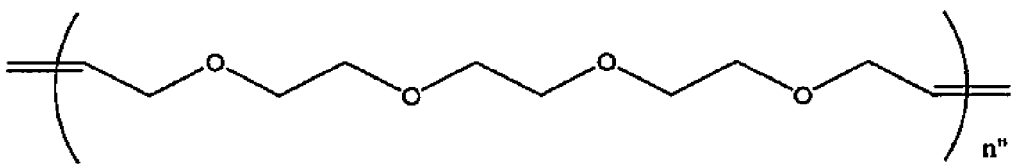

UNITED STATES PATENT AND TRADEMARK OFFICE
CERTIFICATE OF CORRECTION

PATENT NO.       : 7,063,918 B2                              Page 3 of 3
APPLICATION NO.  : 10/380697
DATED            : June 20, 2006
INVENTOR(S)      : Peter Kofinas and Steven Bullock It is certified that error appears in the above-identified patent and that said Letters Patent is hereby corrected as shown below:

At Column 22, lines 30-33, the depicted chemical structure should be replaced with the following structure:

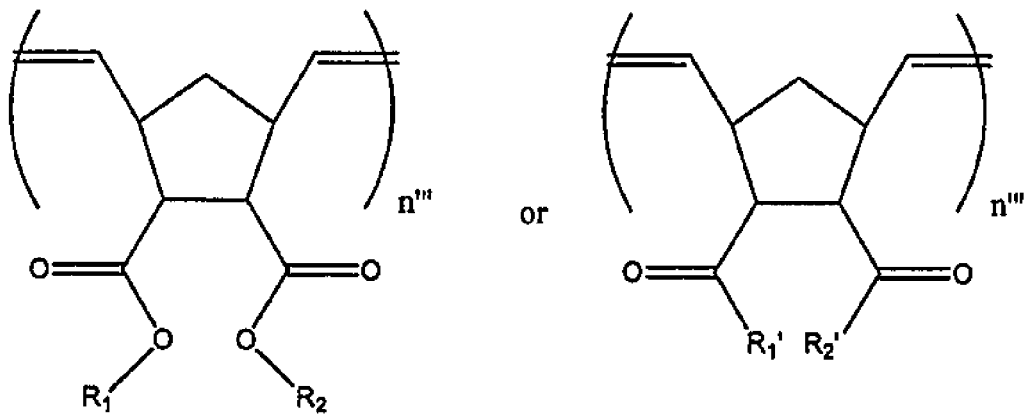

Signed and Sealed this

Thirtieth Day of January, 2007

JON W. DUDAS
*Director of the United States Patent and Trademark Office*